UNITED STATES PATENT OFFICE.

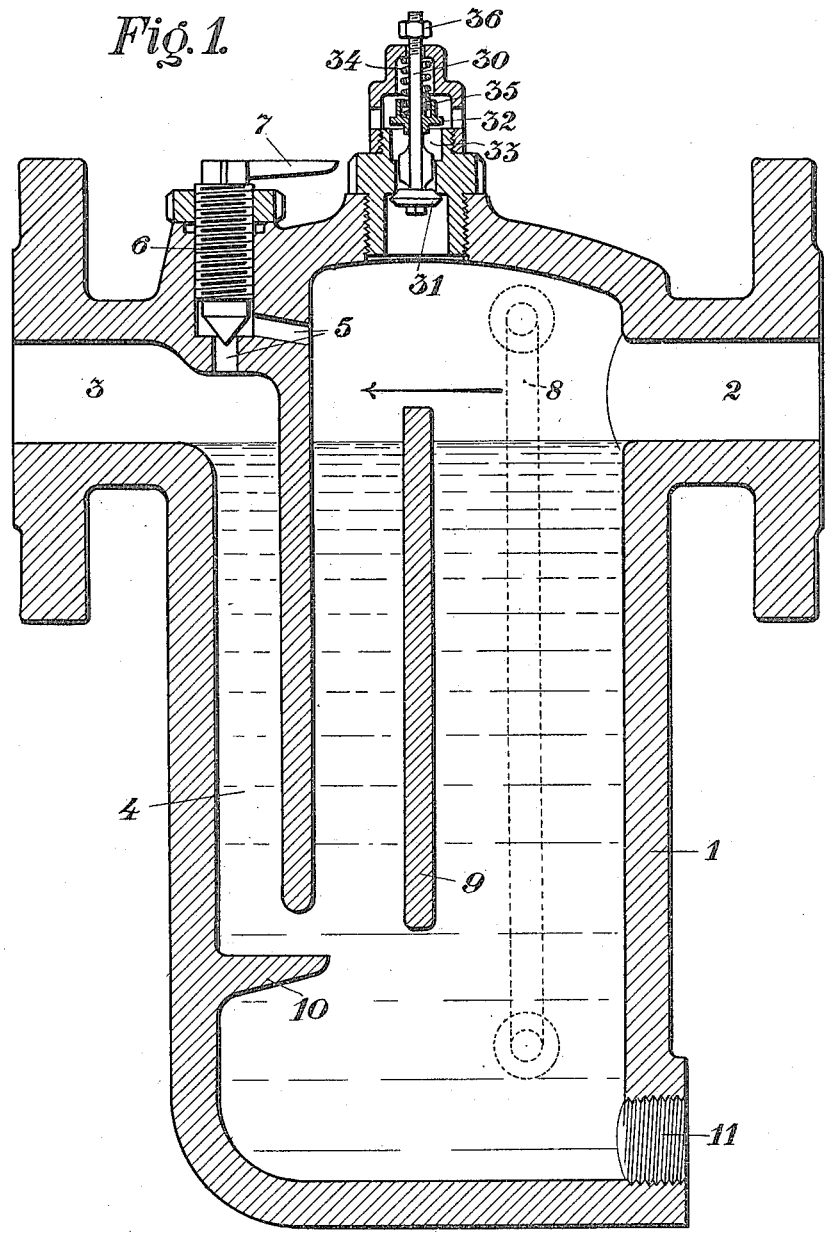

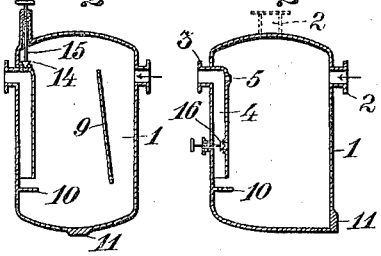

OTTO ROSCHANEK, OF VIENNA, AUSTRIA-HUNGARY, ASSIGNOR TO THE FIRM HÜBNER & MAYER, OF VIENNA, AUSTRIA-HUNGARY.

MULTIPLIER OF EFFICIENCY FOR FLOAT APPARATUS.

1,157,583.      Specification of Letters Patent.      Patented Oct. 19, 1915.

Application filed September 12, 1913. Serial No. 789,575.

*To all whom it may concern:*

Be it known that I, OTTO ROSCHANEK, engineer, citizen of Austria, residing at Vienna, Lower Austria, Austria-Hungary, have invented certain new and useful Improvements in Multipliers of Efficiency for Float Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the disposal of water of condensation in steam lines, and has special reference to an appliance adapted for attachment to a steam trap to increase the efficiency thereof.

The principal object of the invention is to provide an appliance which will increase the effective capacity of a steam trap so as to render the number of operations of the trap less while at the same time maintaining complete discharge of the water from the steam line.

Another object of the invention is to provide means whereby oil, carried over with the steam, may be separated prior to reaching the trap, the oil being collected in the appliance forming the subject matter of this invention and arrangement being made to draw off said oil from time to time.

A third object of the invention is to prevent the formation of a vacuum in the appliance and to permit the discharge of cold air therefrom prior to the operation of the appliance.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a detail section showing the preferred form of the device. Figs. 2 to 11 are various modifications of this form. Figs 12 and 13 are other modifications employing a tubular structure. Fig. 14 is a sectional view of a modification of Fig. 4 shown in connection with a steam trap, a bypass being employed between the two for purposes hereinafter to be described. Figs. 15 to 17 are modifications of the valve arrangement shown at the top of Fig. 1.

In the various modifications shown in Figs. 1 to 11 and also in Fig. 14 the appliance is provided with a body 1 having an inlet 2 and an outlet 3. Depending into the body 1 in each of these forms is a portion, tubular or otherwise, providing an escape passage 4 which communicates with the outlet 3 and communicating with this escape passage from the interior of the body 1 is a bleeder 5. In the form shown in Fig. 1 there is provided, intermediate the ends of this bleeder 5, a valve 6 which is controlled by a handle 7 so that the valve may be opened or closed to any desired degree.

In the form shown in Figs. 3, 4, 6, 7, 8, 9 and 14, the bleeder opens directly into the outlet passage 4 and is similarly equipped with the valve 6 and operating handle 7.

In the forms shown in Figs. 2, 5, 10 and 11, the bleeder opens directly into the outlet passage but is not provided with a valve, the bleeder being regulated in size for the purpose desired during the process of manufacture.

As shown in Fig. 1 a suitable water gage 8 may be provided and as indicated in Figs. 1, 3 and 4 substantially vertical baffles 9 may also be provided. Furthermore horizontal baffles 10 may be disposed below the inlet ends of the passage 4 as indicated in Figs. 1, 4, 5, 8, 10, 11 and 14. In certain forms, as in Figs. 1 and 4 both the vertical and horizontal baffles are employed.

In the form shown in Fig. 5 a second bleeder 5' affords communication from the interior of the body 1 to the passage 4 below the bleeder 5 and this bleeder 5' is controlled by a valve 16 actuated by a handle 7'.

In the form shown in Fig. 6 the mouth of the passage 4 is adapted to be controlled by a valve 17 operated by means of a handle 17'. The same arrangement is used in the modification shown in Fig. 7 but surrounding the lower end of the passage 4 is a cup shaped baffle 18.

In the modification illustrated in Fig. 8 the inlet passage 2 is provided, like the outlet passage, with a downwardly extending passage 4' having a baffle 10 at the bottom and in the upper part of this passage there is provided a bleeder 5ᵃ controlled by a valve 6ᵃ operated by a handle 7ᵃ.

In the form shown in Figs. 9 and 10 the outlet passage 4 is formed by an inverted hood 19 which is supported centrally of the casing by means of a suitable spider 19′, a pipe 20 extending upward into the hood and communicating with the escape or outlet opening 3. In each of these forms the hood 19 is provided with the bleeder but in Fig. 9, as previously noted, the bleeder is controlled by the valve.

In Fig. 10 an annular baffle 10′ is arranged below the hood 19, thus acting in the same manner as the baffle 10.

The form shown in Fig. 11 is especially adapted for insertion in steam lines intermediate the ends of said lines, an outflow or exhaust pipe 21 being provided so that while the outlet 3 may be connected to a steam trap, the dry steam in the upper part of the casing 1 may escape through the passage 21.

In the form shown in Fig. 14 a bypass 24 is provided between the casing 1 and a steam trap 22 of the usual type, the bypass being controlled by a valve 23 and the steam pipe being provided with a manually operable valve 26 so that when desired, by proper manipulation of these valves, the steam trap may be blown out.

In the forms shown in Figs. 12 and 13 the casing 1 is replaced by a U-shaped pipe 1ᵃ having the inlet end 2ᵃ and outlet end 3ᵃ. This outlet end is connected to the usual steam trap T as previously described and between the upper ends of the pipe 1ᵃ, bridging the same, is a bleeder pipe 5ᵇ which is controlled by a valve 6ᵇ, thus taking the place of the bleeder opening 5 and valve 6.

The form shown in Fig. 13 modifies the form shown in Fig. 12 slightly by being provided with a chamber 1′ into which extends a downwardly projecting end 1ᵇ of the outlet branch of the tube 1ᵃ.

In each of the forms just described the arrangement of the bleeder, which it is to be noted opens in all instances directly into the outlet pipe, is such that the major portion of the water of condensation collects in the casing 1 while at the same time a certain portion of the steam passes over into the steam trap there to operate the float, the device being intended to work in connection with a float trap, so that at the same time that the float is operated to open the valves of the trap the water level in the casing 1 will have risen to such height as to be ready to overflow into said trap. Now, as soon as the escape valve from the trap is opened a reduction of pressure takes place in the outlet 3 and the size of the bleeder is so regulated, either during manufacture, or by means of the valves described in connection therewith, that the pressure in the upper part of the casing 1 remains less than the pressure in the escape passage and the trap during the operation of the device, the opening being of such size as to prevent equalizing of said pressure. This causes the steam pressure on the body of water within the appliance to force said water over into the trap until the lower end of the passage 4 has been exposed to the action of said steam pressure. Thus, not only is the water contained in the trap exhausted through the trap exhaust 20 but also the water, or the greater portion thereof, contained in the attachment or appliance is likewise exhausted. Thus the valves in the trap do not have to operate as often as where the device works without the appliance while the appliance itself has no moving valve which operates during the discharge of water. This of course increases the efficiency and lengthens the life of the trap so that a smaller trap can be used with as great efficiency.

By regulating either the size of the bleeder opening or its valve it will be obvious that the pressure in the inlet passage 2 and the pressure in the outlet passage 3 may be equalized after any desired quantity of the contents of the casing 1 has been discharged so that allowance may be made for the collection of the oil on top of the water in the casing 1, the remainder of the water and the oil thereon being drawn off through a suitable opening 11 as shown in Fig. 1, the opening being of course provided with a usual valve. Moreover the arrangement of the baffles prevent both the lighter floating particles of solid matter and the heavier mud from passing over into the trap and thus prevents injury of the trap valves by this accumulation of this solid matter.

In the form shown in Fig. 5 the lower bleeder 5′ may also be used to assist in the discharge of the water while in the forms shown in Figs. 6 and 7 the valve 17 may be used to assist in the balancing of the opening of the passage 4 and the bleeder opening 5 that is necessary for effective operation of the device. In the upper part of any one of these devices there may be provided an air escape or release valve. In the form shown in Fig. 1 this air escape or release valve comprises a valve body 27 fitted in a suitable opening in the top of the casing 1 and provided with a hood 28 having openings 29 in the sides thereof. Slidably mounted in the hood 28 is a valve stem 30 which carries an inwardly opening valve 31 arranged to seat against a suitable seat provided in the body 27. Mounted on the stem 30 is a stop nut 32 surrounded by a flange 35 and surrounding the stem 30 between the stop nut and the top of the hood is a coil spring 34 which normally holds the valve 31 open, the open movement of said valve being controlled by the nut 36 of the outer end of the stem. Thus so long as there is no pressure in the upper part of the casing 1 the valve will remain open and the air can escape. When however pressure comes in the upper part of said casing the valve 31 closes and the device is then ready for operation. In Fig. 15 there is shown a modification of this valve structure wherein there is provided a ball valve 31ª which takes the place of the valve 31 and is provided with a stem 30ª. This stem 30ª passes up through a ball valve 37 having a double conical opening 33 therethrough for the reception of said stem. The stem moreover is provided with suitable tappets 30ᵇ at each side of the ball 37 so as to limit the movement of the stem in the ball. Thereby the ball 37 is raised off the seat before the ball 31ª seats upon the seat so as to provide time for the escape of air. Figs. 16 and 17 show further modifications of this valve wherein there is provided a valve casing 37ª consisting of upper and lower halves between which is secured a diaphragm 38 having port openings 41 therein. This diaphragm 38 in each instance supports a valve 31ᶜ which is arranged to close an opening 41ª in the upper part of the valve casing.

In the form shown in Fig. 16 the valve 31ᶜ is normally held open by means of a ball 39 carried on a lever 39ª and having pivotal connection to a rod 39ᵇ which extends down into the valve stem 33, the latter being hollow. In the form shown in Fig. 17 the upper part of the valve casing 27ª is provided with a hood 28 and opening 29 so that the spring 34ª may be held to bear against a hollow valve stem 40 connected to the valve 31ᶜ thus normally keeping said valve open. In these last two forms the device is practically frictionless.

Having thus described the invention, what is claimed as new, is:—

1. In an attachment for steam traps, a casing having an inlet and an outlet, said attachment being provided with a blow-off passage leading downward from said outlet, said attachment being provided with a bleeder communicating directly between the inlet and outlet portions thereof above the mouth of said passage.

2. In an attachment for steam traps, a casing having an inlet and an outlet, said attachment being provided with a blow-off passage leading downward from said outlet, said attachment being provided with a bleeder communicating directly between the inlet and outlet portions thereof above the mouth of said passage, and a valve controlling said bleeder.

3. In an attachment for steam traps, a casing having an inlet and an outlet, said attachment being provided with a blow-off passage leading downward from said outlet, said attachment being provided with a bleeder communicating directly between the inlet and outlet portions thereof above the mouth of said passage, a valve controlling said bleeder, and a second valve controlling the mouth of said passage.

4. In an attachment for steam traps, a casing having an inlet and an outlet, said attachment being provided with a blow-off passage leading downward from said outlet, said attachment being provided with a bleeder communicating directly between the inlet and outlet portions thereof above the mouth of said passage, and a relief valve in the top of said casing.

5. In an attachment for steam traps, a casing having an inlet and an outlet, said attachment being provided with a blow-off passage leading downward from said outlet, said attachment being provided with a bleeder communicating directly between the inlet and outlet portions thereof above the mouth of said passage, and a baffle across the mouth of said passage.

6. In an attachment for steam traps, a casing having an inlet and an outlet, said attachment being provided with a blow-off passage leading downward from said outlet, said attachment being provided with a bleeder communicating directly between the inlet and outlet portions thereof above the mouth of said passage, a valve controlling said bleeder, and a baffle across the mouth of said bleeder.

7. In an attachment for steam traps, a casing having an inlet and an outlet, said attachment being provided with a blow-off passage leading downward from said outlet, said attachment being provided with a bleeder communicating directly between the inlet and outlet portions thereof above the mouth of said passage, a valve controlling said bleeder, a baffle across the mouth of said bleeder, and a relief valve in the top of said casing.

In testimony whereof I have signed my name to this specification in the presence of two subscribing witnesses.

OTTO ROSCHANEK.

Witnesses:
SIGMUND BAUER,
AUGUST FUGGER.